United States Patent [19]

Billard et al.

[11] Patent Number: 4,524,670
[45] Date of Patent: Jun. 25, 1985

[54] SECURING APPARATUS FOR MODULES CARRIED ON AIRCRAFT, IN PARTICULAR FOR FLARE LAUNCHING MODULES

[75] Inventors: Alain A. Billard, Muret; André R. Santalucia, Leguevin; Christian Breseghello, Saverdun, all of France

[73] Assignee: Societe E. Lacroix-Tous Artifices, Muret, France

[21] Appl. No.: 384,097

[22] Filed: Jun. 1, 1982

[30] Foreign Application Priority Data

Jun. 3, 1981 [FR] France .................. 81 10974

[51] Int. Cl.³ .................. F41F 5/00; B64D 1/04
[52] U.S. Cl. .................. 89/1.53; 89/1.51; 102/340
[58] Field of Search .......... 89/1.5 R, 1.5 C, 1.5 E; 102/337, 338, 340, 342, 357; 244/137 R; 248/339, 340

[56] References Cited

U.S. PATENT DOCUMENTS

| 2,828,690 | 4/1958 | Freri | 102/337 |
|---|---|---|---|
| 3,040,629 | 6/1962 | Duncan et al. | 89/1.819 |
| 3,243,153 | 3/1966 | Kelly et al. | 248/72 |
| 3,623,398 | 11/1971 | Meier et al. | 244/137 R |
| 3,633,509 | 1/1972 | Grandy | 102/338 |
| 3,712,232 | 1/1973 | Abel et al. | 102/340 |
| 4,129,271 | 12/1978 | Hasquenoph et al. | 89/1.5 C |
| 4,164,887 | 8/1979 | Ouellette | 102/357 |
| 4,193,347 | 3/1980 | Stier et al. | 102/433 |
| 4,357,855 | 11/1982 | Merz | 89/1.819 |
| 4,362,456 | 12/1982 | Klausbruckner et al. | 89/1.815 |

FOREIGN PATENT DOCUMENTS 1001802 2/1952 France .
2036520 12/1970 France .

Primary Examiner—Charles T. Jordan
Attorney, Agent, or Firm—McCormick, Paulding & Huber

[57] ABSTRACT

Located below an aircraft is a support rod (1) provided with female engagement members (10). Standard missile launcher modules are provided on their flat upper wall with counterpart male engagement members (20). The engagement members (10 and 20) cooperate in the manner of dovetails and for each module location, they are separated from each other according to the same geometric progression along the support rod (1) and the upper wall of the module (2). A device comprising a cam (27) and lever (273) makes it possible to ensure at the same time the translation necessary for locking of the dovetail, as well as the making of contact between the electrical connector members.

10 Claims, 22 Drawing Figures

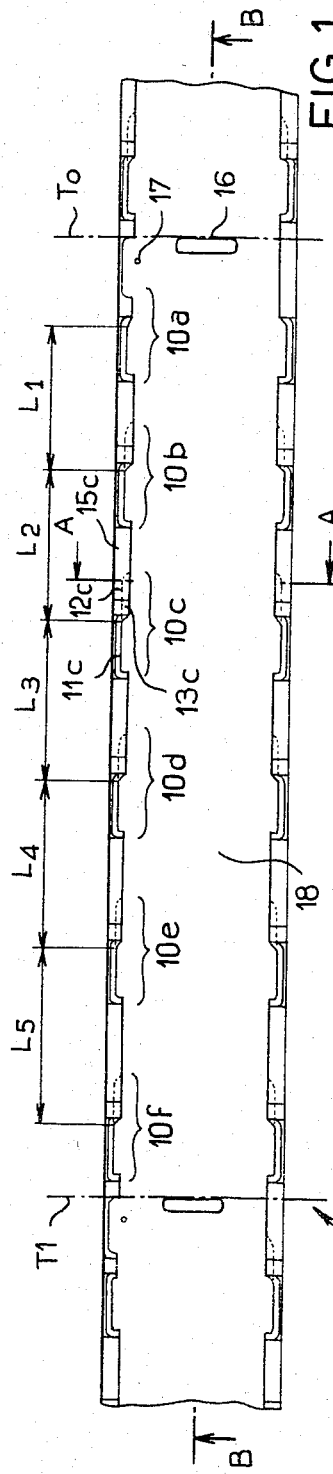
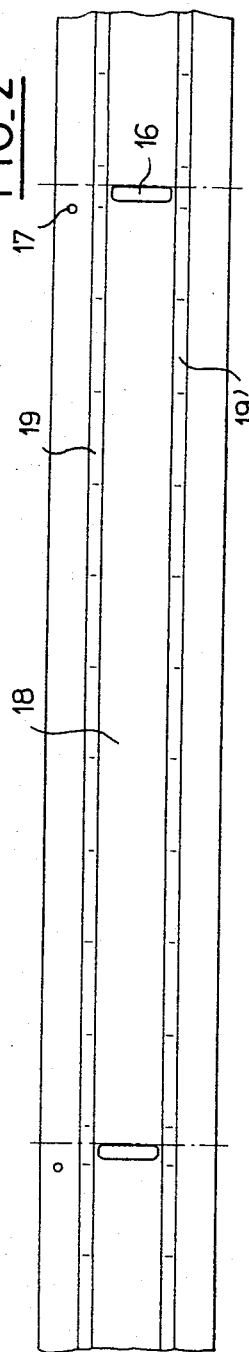
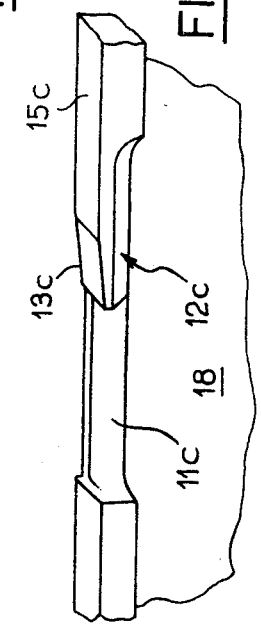
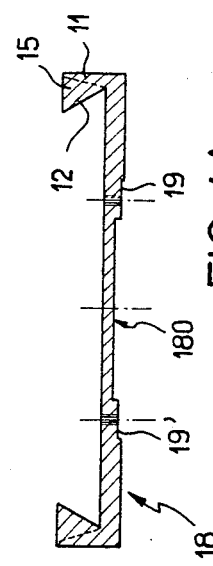

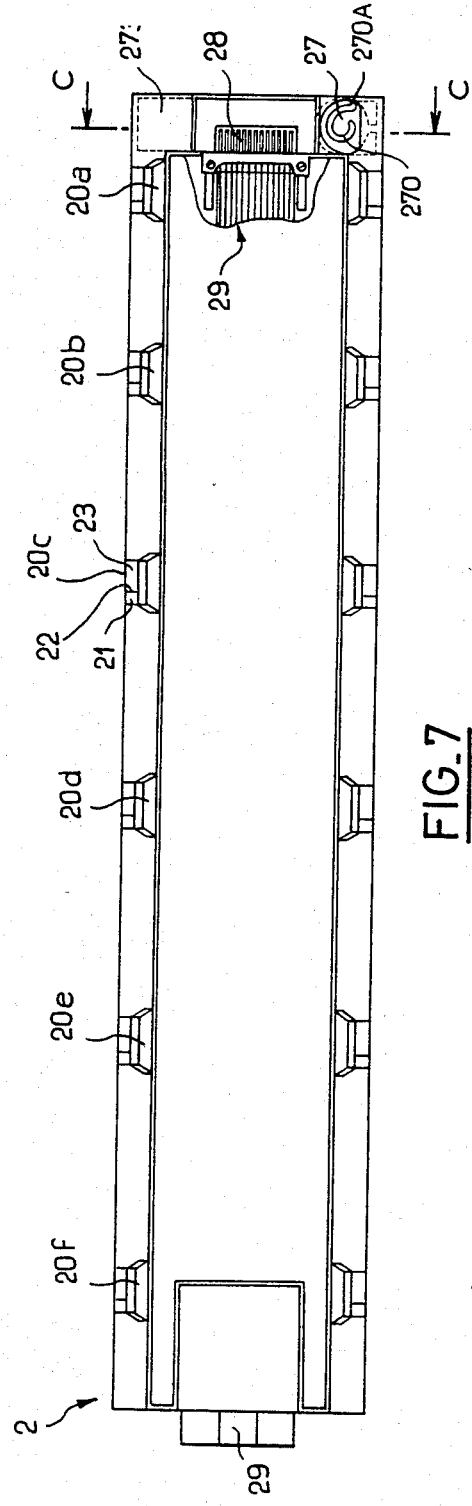
FIG_7
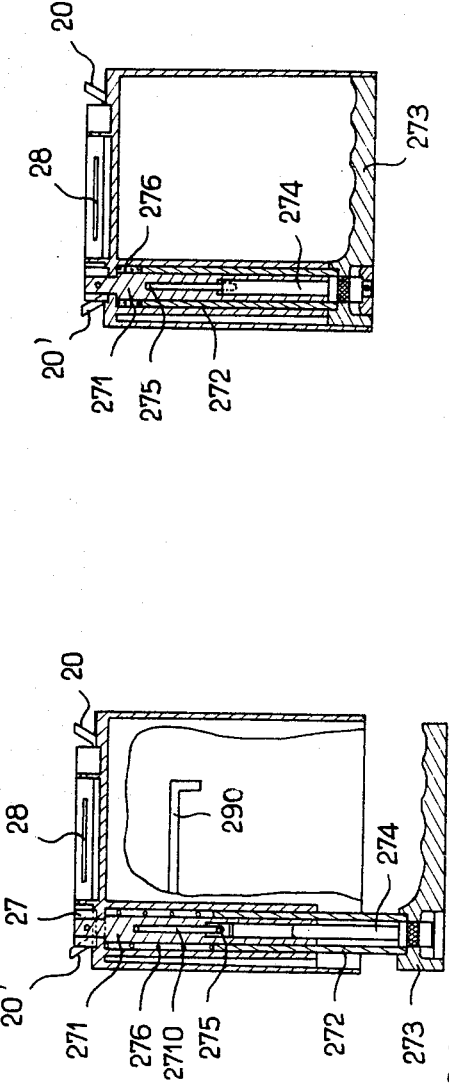
FIG_8B
FIG_8A

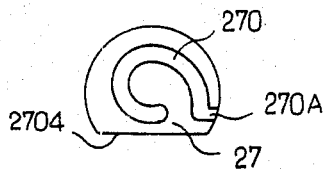
FIG_7A
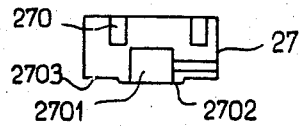
FIG_7B
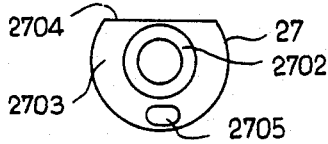
FIG_7C
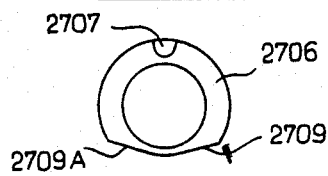
FIG_7D
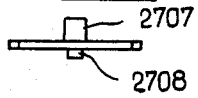
FIG_7E
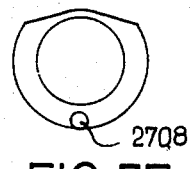
FIG_7F
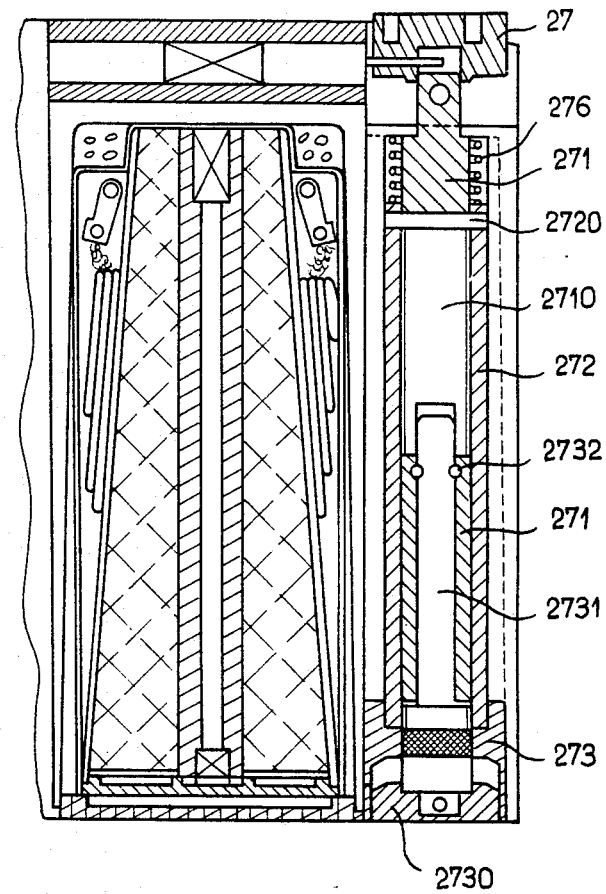
FIG_9A
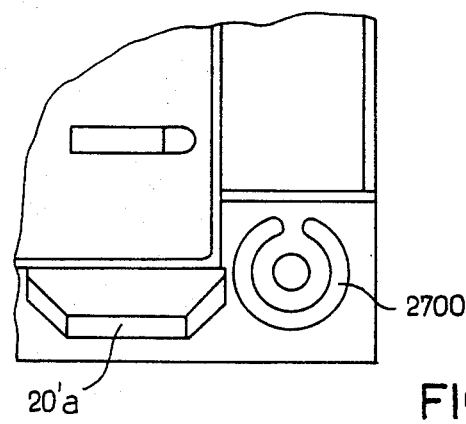
FIG_7G

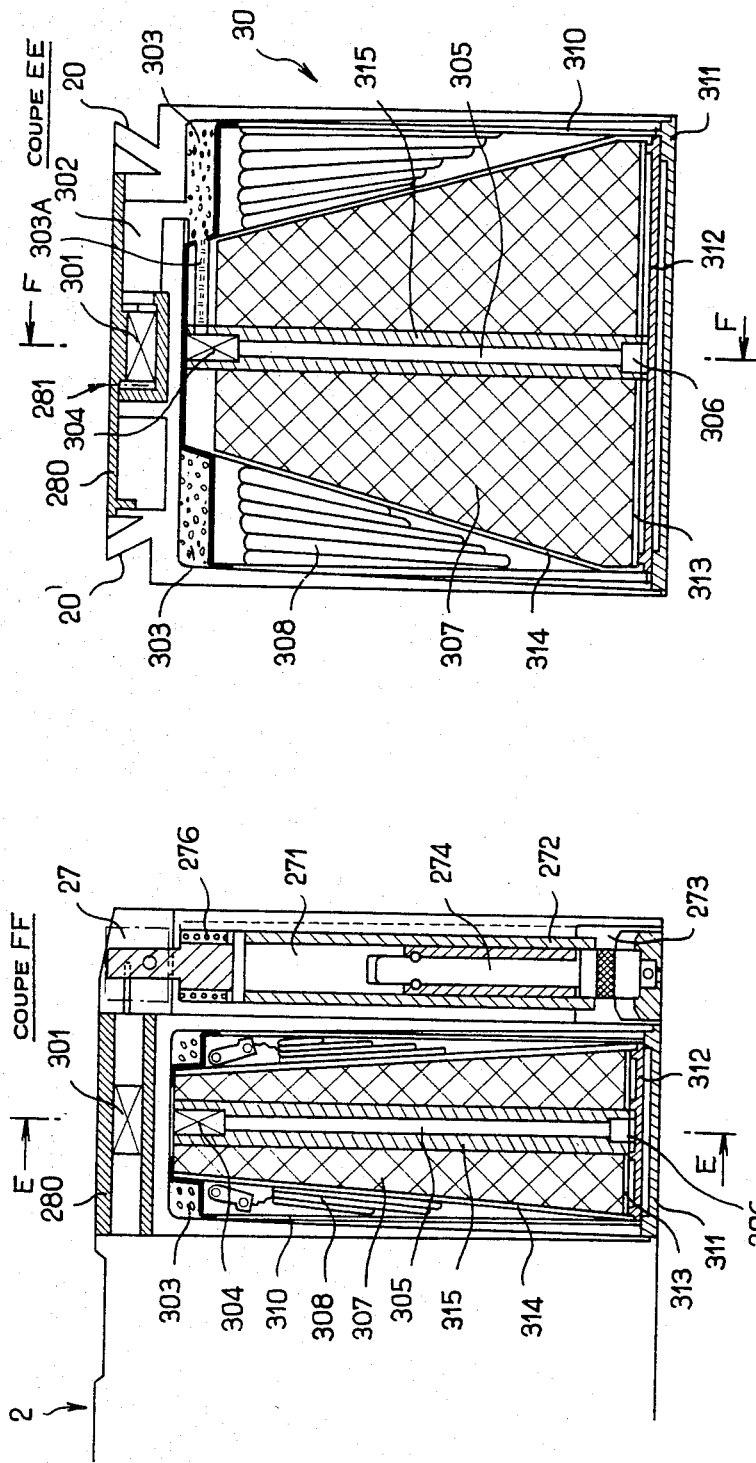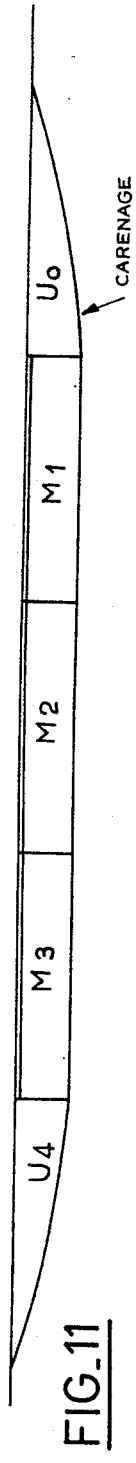

SECURING APPARATUS FOR MODULES CARRIED ON AIRCRAFT, IN PARTICULAR FOR FLARE LAUNCHING MODULES

The invention relates to equipment carried on board for launching missiles and/or countermeasures, in particular for aircraft.

Equipment of this type must fulfill numerous criteria such as: compactness (master-torque and volume) versatility without changing the interface for carrying different types of load, ergonomics—ease of positioning and removal—safety, reliability. These last two criteria are difficult to satisfy in the very varied environment existing on an aircraft: the temperature variations, pressure variations and vibration conditions will be noted in particular.

The positioning of different types of useful loads below an aircraft causes delicate problems: difficult choice of location, in view of the small amount of free space in the aircraft, external aerodynamic stresses as well as incompatibilities to be reconciled between various equipment or parts.

In addition, the integration of commands from the cockpit must be able to take place reliably and also selectively as well as in a versatile manner, whatever the type of load in question.

The present invention intends to provide solutions to these various problems.

In order to resolve these problems, it is proposed to use standard launcher modules.

On the carrier vehicle (generally an aircraft), a support rod is provided with female engagement members; in turn the module comprises a rectilinear wall, extending towards the support rod and on which counterpart male engagement members are provided.

According to an important feature of the invention, the mechanical engagement members cooperate in the manner of dovetails.

Advantageously, for each module location, the engagement members are separated from each other along the support rod and the rectilinear wall in a chosen manner in order to prevent the spreading of vibrations. A separation with geometric progression is particularly advantageous for this purpose.

One thus obtains an attachment which is reliable and virtually insensitive to vibrations.

Very advantageously, the support rod contains notches for the introduction of the male engagement members, adjacent its female engagement members and reversible mechanical means are also provided which are suitable for ensuring a relative translation between the support rod and the module, from the "module engaged" position to the "module locked" position.

In a particular embodiment, in the vicinity of the module, the mechanical means comprise a lever rotatable through 360° between two clear stops, coupled with a roller containing an associated spiral cam, as well as a lug integral with the support rod in the predetermined position and able to cooperate with the cam in order to ensure said translation.

Preferably, the lever can be retracted into the module at one of its ends, the retraction position corresponding to the locked position. Provided at the opposite end of the module is a gripping handle. One thus obtains a construction which is in one piece and at the same time easy to handle.

As regards the control, the support rod contains an axial passage for electrical control and monitoring connections. Each module contains corresponding electrical connections and provided between these connections is a connector, which can be plugged in at the same time that the module is positioned.

The control may thus be made selective in a particularly simple manner, by associating an electrical lead with each number or set of controlled members. The identification of the type of module is also achieved by associating with the type of module a particular combination of short circuits between certain wires from the connector on the module side. The control device carried on board the aircraft thus immediately recognizes the type of module present.

Preferably, the code for the identification of the module will be established in relation to the number of controlled members, so that whatever the type of module, the electrical control lines always assume the same positions and are used in a preferred order from the line corresponding to the maximum grade of controlled members.

The apparatus according to the invention may have numerous applications. The present invention defines one of the latter: the module comprises a series of containers each containing a flare charge connected to actuating pyrotechnics and a parachute. The ejection of the containers is triggered by pyrotechnic initiation on electrical command.

Very advantageously, the flare charges of the various containers of the same module are matched with pyrotechnic delays, on the one hand associated with the extraction of the parachute, on the other hand with the ignition of the flare charges. These delays are staggered so that after a sequential ejection of containers at suitable speeds, the flare charges are ignited virtually simultaneously when they will be substantially at the same altitude.

More particularly, the charge-carrying cups are flared towards the outside of the module and ignited at their free end, through an axial channel, which makes it possible to maintain substantially constant, intense illumination over a wide area and this is maintained throughout the period of combustion of the flare charges.

Further features and advantages of the invention will become apparent from reading the ensuing detailed description, as well as on examining the accompanying drawings in which:

FIG. 1 is a bottom plan view of a support rod according to the invention, in the version intended for an aircraft;

FIGS. 2, 3 and 4A are respectively a sectional view B—B, a top plan view and a sectional view A—A of the apparatus of FIG. 1;

FIG. 4B is a perspective view showing more clearly the structure of one of the female gripping members incorporated in the support rod of the preceding figures;

FIG. 7 is a top plan view of the module of FIG. 5;

FIGS. 7A and 7G illustrate the upper members of the locking cam;

FIGS. 8A and 8B illustrate the disengaged and inserted positions of the locking handle;

Figure 5:
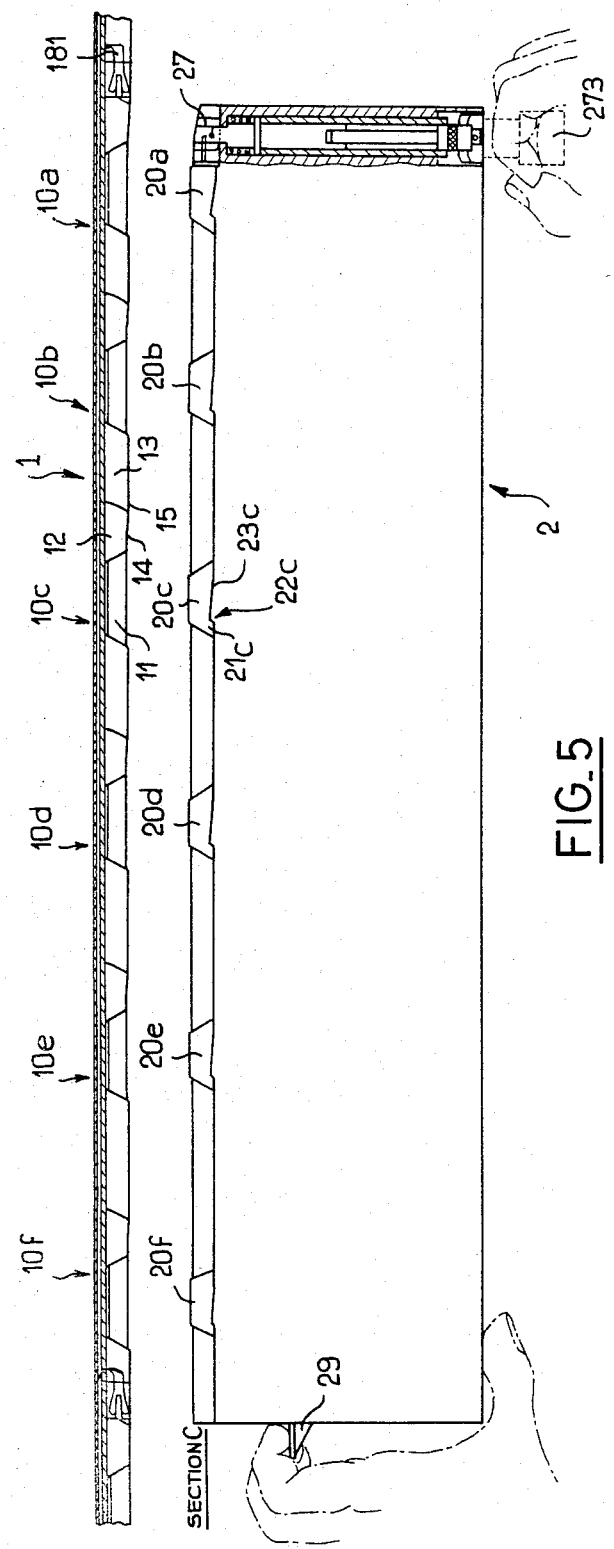
FIG. 5 is a side view showing the positioning of a module according to the invention in the support rod already illustrated.

FIGS. 9 (enlarged in 9A) and 10 are two corresponding views illustrating the contents of a module according to the invention in the form of a series of devices comprising a flare charge; and FIG. 11 shows diagrammatically how it is possible to place or integrate modules according to the invention below or in the wing or fuselage of an aircraft.

In FIG. 1, a module location is defined between the axis lines $T_0$ and $T_1$. The support rod illustrated bears the general reference numeral 1. This support rod is defined by a base 18, provided with lateral projections, which define a plurality of female engagement devices 10a, 10b, 10c, 10d, 10e and 10f, on the parallel edges of the support rod, on either side of the latter. As shown in FIGS. 1, 2, 4A and 4B, these female engagement members are of the dovetail type. Each engagement member, for example 10c, firstly comprises a notch 11c which will allow the passage of a counterpart male engagement member of the module. Located adjacent the notch 11c is a device comprising a dovetail proper, defined by an inclined edge 12c, whereof the stage flares out at an angle of 60° from the base 18 of the support rod. Above, an inclined ramp 13c is followed by a flat part 15c, parallel to the base of the support rod. As will be seen hereafter, one thus ensures that there will truely be gripping with clamping of the male dovetailed members of the module between the inclined face 12c and the ramp 13c.

Adjacent one end of the mounted module, the support rod has an orifice 16, which passes through the base 18 of the support rod and allows the passage of connections such as the electrical control connections. As shown in FIG. 4A as well as FIG. 3, the outer side of the base 18 is provided with a recess 180 which facilitates the passage of these electrical connections as far as each of the orifices 16, a cover being able to be fixed to flat parts 19 and 19' at an intermediate level, by means of screws. The electrical connections are advantageously provided by means of flexible printed circuit boards, possibly with a double layer. Thus each board is associated with one module. In FIGS. 1 to 3, the reference numeral 17 designates a lug, which on the support rod is the member serving to ensure locking of the module with respect to the rod.

According to an important aspect of the invention, the female engagement members 10a to 10f are separated from each other according to a geometric progression along the support rod. Thus, the separations of the engagement members have the following relationships:

$$(L5/L4) = (L4/L3) = (L3/L2) = (L2/L1) = q.$$

In a particular embodiment, the Applicant has chosen the ratio q equal to 1.056. Generally, the ratio q of the geometric progression may be chosen to be between approximately 1.01 and approximately 1.1.

In FIG. 5, the upper part shows the support rod member already described. The lower part of this figure shows a module 2 according to the present invention. It is apparent that this module comprises male engagement members 20a to 20f, which are themselves also in the form of dovetails and are separated according to the same geometric progression as previously described for the female members. In the right-hand part, FIG. 5 also shows a rotary lever which will serve to ensure locking of the module on the support rod and the left-hand part shows a fixed gripping handle 29 which, as shown in FIG. 8A, is housed in a recess 290 of the adjacent module. This recess is naturally provided adjacent the rotary lever.

Figure 6B:
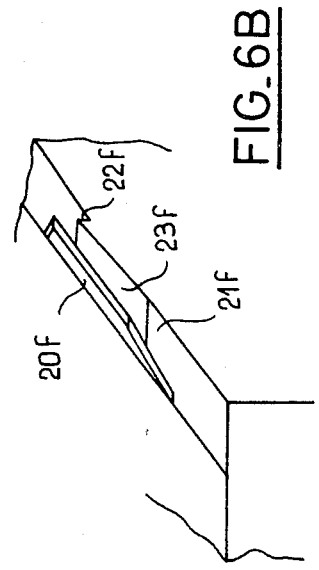
FIGS. 6A and 6B show more clearly the male engagement device incorporated in the module of FIG. 5.
Figure 6A:
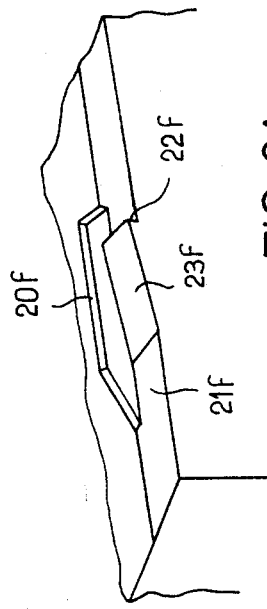

FIGS. 6A and 6B show one of the male engagement members in a more detailed manner. This member is essentially constituted by a lip 20f, inclined obliquely at an angle of 60° towards the outer wall of the module, in a manner corresponding to the angle of inclination of the edges 12 of the support rod. This lip is arranged on the upper part of the module, which is generally flat. However, it will be observed that underneath each of the lips such as 20f, the upper wall of the module defines an ascending inclined plane 23f, connected by means of a portion 22f to the normal level 21f of the top of the module.

The lips such as 20f will firstly be engaged in notches such as 11c of the support rod (FIG. 4B). By a translation towards the right, the lip 20f, thus engages the inclined edge 12c, whereas the inclined plane 23f will rise on the slope 13c. The lip 20f is thus acted upon by torsion, which ensures an excellent, solid coupling of the dovetailed type, with the clearance between the two parts of the assembly being completely taken up. The present invention provides an apparatus which at the one and the same time and in a reversible manner ensures locking of the module and the end of the translational movement which has been described.

FIGS. 5, 7, 8A and 8B show a roller 27, provided in the upper part with a spiral groove defining a cam path 270 to cooperate with the aforementioned lug 17 in the support rod. The cam path 270 comprises an entrance 270A which is accessible by the lug 17 when a handle 273 (connected to the cam) is in the unlocked angular position.

The module is positioned as follows:

the operator pulls out the handle 273 (FIG. 8A), which he holds with one hand; with the other hand he grips the handle 29;

he engages the module vertically in recesses such as 11c, (a single position is possible for each module location);

he moves the module horizontally in order to engage the cam entrance 270A in abutment with the lug 17; the module is now engaged on its support, but with some play;

he finally turns the handle 273 through one revolution; the cam 270 and the lug 17 interact in order to move the module towards the right and to produce the aforedescribed locking without play. The handle 273 may thus return to its housing (FIG. 8B).

The structure of the lever system will now be described in more detail with reference to FIGS. 7A to 7G and 9A.

FIG. 7A illustrates the roller 27 in plan view, with the cam profile 270 and its entrance 270A, as well as a lateral flat portion 2704. In section (FIG. 7B), the same roller comprises a blind bore 2701 on the one side, which bore is surrounded by an annular shoulder 2702, itself surrounded by a ring-shaped plate 2703. The bottom view (FIG. 7C) shows that the same roller comprises, on the side opposite the flat portion 2704, a groove 2705 which subtends a limited angle of a segment of a ring.

Arranged to rotate on the shoulder 2702 is a washer 2706, provided on one side with a lug 2707 entering the groove 2705 and on the other side with a second lug 2708 engaging in a complementary groove 2700 provided in the body of the module (FIG. 7G). The washer 2706 also comprises two flat portions 2709 and 2709A separated by the arc subtended by the groove 2705.

Keyed in the shoulder 2701 of the roller 27 is the head of an actuating shaft 271, provided lower down with a radial through-hole 2710, in which a rod 2720 is able to slide, the said rod being connected to a tube 272, itself fixed to the handle 273. This sliding takes place under the action of spring return means 276, whereas the other end of the shaft 271, bored out axially, houses a spindle 2731 comprising balls, actuated by a push buttom 2730 incorporated in the handle 273.

Housings are provided for the balls such as 2732 in the shaft 271 in order to keep the handle engaged in the module, at a predetermined angle.

Although the handle rotates through 360° for actuation, the parts 27 and 2706 define two clear stops between two positions:

one for which the cam entrance 270A arrives opposite the lug 17 of the support rod;

the other for which the lug 17 is in locking engagement with the cam 270.

It will be noted that the shape of the cam 270 makes it possible to apply increasing torque for the engagement of the lips 20 on the female dovetail profiles 12. A certain deformation of the lips 20 will occur when the handle has returned to its housing in the locked position.

FIG. 7 shows a connector member 28, associated with connections 29 provided adjacent the module 2. A corresponding connector member is mounted in a floating manner adjacent the support rod, as shown diagrammatically at 181 in FIG. 5. The plugging of two connector members one into the other is naturally achieved in the same way and at the same time as the attachment, by the translation produced at the time of the latter.

An application of the invention will now be described with reference to FIGS. 9 and 10. FIG. 9 shows the right-hand part of the module, as it is illustrated in FIG. 5. Just to the left of the pivoted locking device with the roller 27 and the handle 273, the first of a series of containers 310 for flare charges 307 can be seen. These containers are of generally rectangular structure, whereof the major side is arranged along the width of the module. The container 310 is closed by a cover 311. Each container 310 contains a cup 314 enclosing the charge 307 below another cover 312. Finally, the flare charge 307 is provided on the open side of the conical cup 314 with an igniting charge.

It will also be noted that the flare container contains a parachute 308 connected to the cup 314. Electrical connections such as 281, starting from the connector 28 already mentioned, extend selectively to the initiator 301 of each of the containers. This initiator 301 is connected to a relay device 302, mounted transversely and which actuates a ring-shaped discharge charge 303, followed by a delay 303A to the charge 304 which ejects the container 310 and releases the parachute 308, which thus retards the descent of the cup 314.

Then, the charge 304 excites a pyrotechnic delay 305, confined in an axial tube 315. The fire terminates at a relay pellet 306, which will ignite the ignition charge 313, then the useful charge 307.

The modular design of the present invention provides interesting advantages, which are revealed in particular with a flare charge of this type: in fact, by giving the flare charges 307 of the various containers located in the same module staggered pyrotechnic delays, chosen in accordance with a pre-established sequential ejection, for a given speed of an aircraft, it is possible to achieve virtually simultaneous ignition of various projectiles of the same module (or of several modules), which thus produces sudden and intense illumination over a very wide area.

According to another aspect of the invention, the charges illustrated in FIGS. 9 and 10 comprise outwardly flared cups 314 which are ignited at their free end, which tends to keep the illumination constant during the descent of the parachute.

FIG. 11 shows how various modules according to the present invention may be located below the wing of an aircraft. The main horizontal line represents the lower edge of the wing, in this case provided with three modules according to the invention, with their support rod, between two stream-lined portions $U_0$ and $U_4$, having a suitable profile. These stream-lined areas may serve to contain the electronic control and monitoring casings, connected to the above mentioned electrical connections in the support rod.

In each module, it is very simple to provide interconnections pre-established in the vicinity of the connector 28, which inter-connections represent the type of module present in an unequivocal manner. The control unit $U_4$ may thus recognize very easily the module load with which the aircraft is equipped, one by one and actuate the suitable module in the desired manner at any instant, whatever the position of the latter.

According to another feature of the invention, the modules and possibly their support rod may be produced integrally from non-metallic material, for example in the form of high quality synthetic resins, such as those which are known by the names of PPS, or polysulfonate or polyurethane containing glass and/or carbon fibres.

We claim:

1. Securing apparatus for modules carried on board a craft, comprising a support rod mounted to a craft for engagement and disengagement of a replaceable module, the rod being elongated and provided with a series of female engagement members and associated notches distributed along the length of the rod with unequal separations (L1, L2, L3, . . . ) of the members established according to a predetermined geometric progression in which $$(L2/L1)=(L3/L2)= \ldots =q$$

for dissipation of vibrations, the module being provided with counterpart male engagement members separated according to the same geometric progression as the female members on the support rod for insertion in the notches and engagement with the female members, the female and male engagement members also providing dovetail engagements for securely fixing the module to the craft.

2. Apparatus according to claim 1, wherein the support rod contains an axial passage for electrical control connections, and each module contains electrical control connections and provided between these connections is a connector which can be plugged in at the same time as the positioning of the module.

3. Apparatus according to claim 2, wherein reversible mechanical means are provided which are able to ensure a relative translation between the support rod and the module, between an introduction position and a locking position.

4. Apparatus according to claim 3, wherein the mechanical means comprise a rotary lever having a spiral cam incorporated in the module, as well as a lug integral with the support rod in a predetermined position and able to cooperate with the cam in order to ensure said translation.

5. Apparatus according to claim 4, wherein the lever can be retracted into the module, the retraction position corresponding to locking.

6. Apparatus according to claim 5, wherein the lever is connected mechanically to the cam by a connection allowing two clear abutments over a 360° rotation.

7. Apparatus according to claim 2, wherein the module carries electrically controlled members and one part of the electrical connections on the module comprises interconnections representative of the type and number of appliances carried in the module and a grade is given to another part of the electrical connections which is predetermined for the excitation of a maximum number of controlled members carried, providing that the excitation orders coming from outside the module are executed reliably, whatever the number of controlled members carried by the module.

8. Apparatus according to claim 1 wherein the module comprises a series of containers for flare charges each equipped with a parachute and which can be ejected by pyrotechnic initiation on electrical command.

9. Apparatus according to claim 8, wherein the flare charges of the various containers of the same module are matched with staggered pyrotechnic delays for the extraction of the parachute on the one hand and the ignition of the flare on the other hand, which makes it possible to eject them in sequence, whilst igniting them virtually simultaneously, substantially at the same altitude.

10. Apparatus according to one of claims 8 and 9, wherein the containers contain outwardly flared cups which are ignited by their free end through an axial channel, which allows an illumination during the descent by parachute.

* * * * *